Feb. 26, 1963  L. F. STREET  3,078,511
TREATMENT OF PLASTIC MATERIALS
Filed March 31, 1960  2 Sheets-Sheet 1
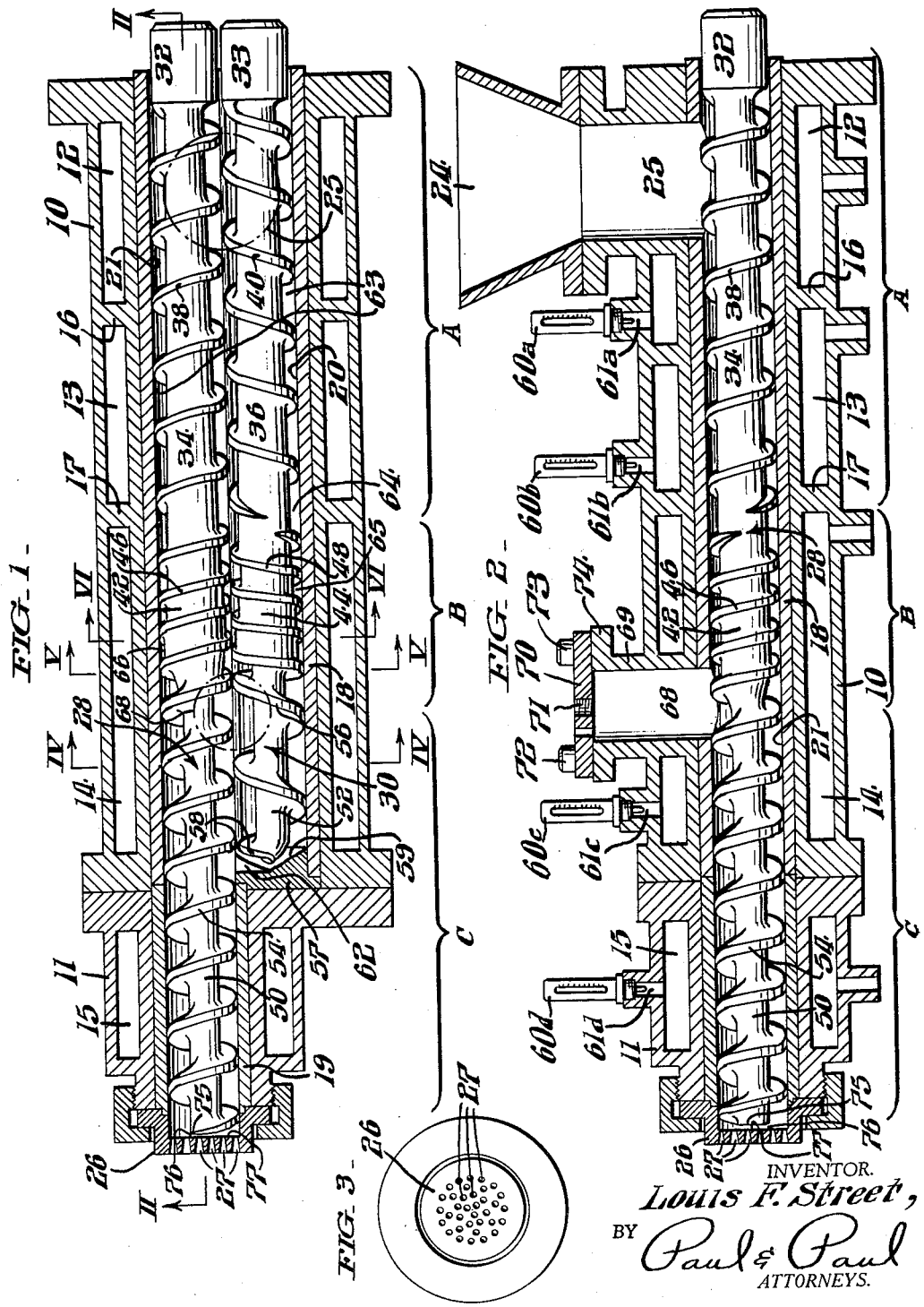
INVENTOR.
Louis F. Street,
BY Paul & Paul
ATTORNEYS.

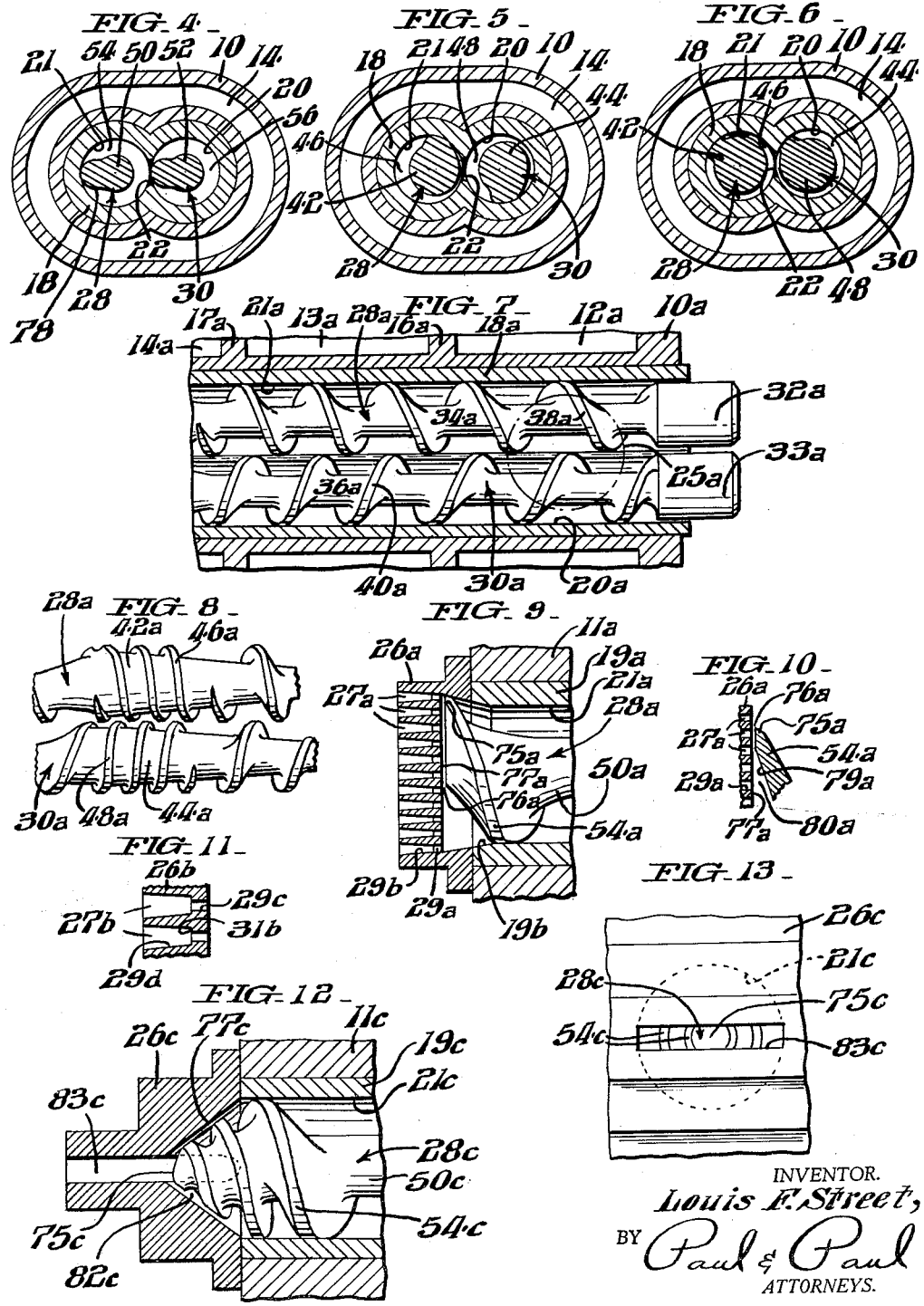

United States Patent Office 3,078,511
Patented Feb. 26, 1963

3,078,511
TREATMENT OF PLASTIC MATERIALS
Louis F. Street, Norristown, Pa., assignor to Welding Engineers, Inc., Norristown, Pa., a corporation of Delaware
Filed Mar. 31, 1960, Ser. No. 19,021
10 Claims. (Cl. 18—12)

This invention relates to the treatment of heat-sensitive plastic materials. More particularly, this invention relates to an improved apparatus and process for the continuous treatment of thermoplastic materials requiring especial care in the mixing, compounding, reacting and plasticizing thereof, and, more especially, for the similar treatment, within the plastic range thereof, of thermosetting materials, such as phenol-formaldehyde and melamine-formaldehyde, and of molding mixtures and compounds based upon such resins. This application is a continuation-in-part of my co-pending application, Serial No. 336,947, filed February 16, 1953, and now abandoned.

In the past, thermosetting resins intended for use with fillers, lubricants, pigments or dyes, catalysts, and the like, and mixed together therewith to prepare a molding powder granule have usually been treated by batch method on a device such as a horizontal two-roll mill. It is a typical disadvantage of this method, however, that all of the material in a batch does not receive the same treatment for the reason that some of the material is necessarily removed from the mill as finished, an appreciable time before the remaining portions are removed. As a consequence, therefore, the latter portions are subjected to more heating and working than the former. A further disadvantage of the aforesaid method results from the fact that some types of mixes are not readily processed on a horizontal roll mill and consequently, the operation is frequently attended by high cost or poor product quality.

Accordingly, it is an object of this invention to provide a method of treating heat-sensitive plastic materials whereby improved quality in the materials processed therethrough is achieved over the quality ordinarily obtainable by other commercial means.

It is another object of this invention to provide an apparatus and method for the continuous treatment of plastic materials to maintain uniformity of mixture throughout the processing whereby all portions of the finally extruded product are polymerized to the same extent.

It is another object of this invention to provide processing means for the treatment of plastic materials that will yield a product having a more desirable physical form than can normally be obtained by other means.

It is another object of this invention to provide a continuous method of processing thermoplastic materials, as well as thermosetting materials, within the plastic range thereof, while simultaneously pre-curing the aforesaid resins prior to the final curing or polymerization thereof in the molded form.

It is another object of this invention to provide means for treatment of thermosetting phenol-formaldehyde or melamineformaldehyde molding powders by the dry extrusion method, from a powder mix feed into a product of pellet form ready for the final molding operation.

Further objects and attendant advantages of this invention will become apparent from the following description and in the drawings, wherein:

FIG. 1 is a sectional view in plan illustrating a specific form of apparatus in accordance with this invention;

FIG. 2 is a view in vertical section taken as indicated by the lines and arrows II—II of FIG. 1;

FIG. 3 is a front end view of a die of the apparatus as provided in accordance with this invention;

FIG. 4 is a view in transverse section taken as indicated by the lines and arrows IV—IV of FIG. 1;

FIG. 5 is a view in transverse section taken as indicated by the lines and arrows V—V of FIG. 1;

FIG. 6 is a view in transverse section taken as indicated by the lines and arrows VI—VI of FIG. 1;

FIG. 7 is a sectional view in plan illustrating a modification of the feed portion of the worms of the apparatus;

FIG. 8 is a view in perspective of a modification of the resistor portion of the worms of the apparatus;

FIG. 9 is an enlarged sectional view of a modification of the die and worm tip of the apparatus;

FIG. 10 is a fragmentary view of the modified die and end of the worm flight;

FIG. 11 is a sectional view of a further modification of the die;

FIG. 12 is a sectional view of another modification of the die, showing a modified worm for use therewith; and FIG. 13 is a front end view of the modified die and worm illustrated in FIG. 12.

The following description is directed to the specific forms of the apparatus and method as shown in the drawings and is not intended to be addressed to the scope of the invention as exemplified by the drawings. It will be appreciated that the drawings represent preferred embodiments of the invention, which is capable of being practiced in a wide variety of forms and arrangements.

Adverting herewith to the specific form of the invention illustrated in the drawings, a casing 10 is provided around a portion of the apparatus having two worms and another casing 11 around the portion having a single worm, although these casings can be made as a single unit if desired. The casing is jacketed at 12, 13, 14 and 15, for the purpose of temperature control by a circulating medium such as hot oil or steam, for example. Other heating means known to those skilled in the art may be substituted. The jacket zones 12, 13, 14 and 15 are separated by partitions as at 16 and 17. Replaceable abrasion resistant liners 18 and 19 are fixed within casings 10 and 11 and form the hard-faced cylindrical surfaces therein. Liners 18 and 19 facilitate replacement for wear when the inner bores 20 and 21 become worn beyond the point of satisfactory operation. Corrosion-resistant materials may be used in liners 18 and 19 when required. A hopper 24 connected to a feed opening 25 is located near and above one end of the apparatus, and a die 26 with orifices 27 is fixed at the discharge end. A main worm 28 and an auxiliary worm 30 are rotatably mounted within the lines 18 and 19 and cooperate in treating the plastic material. The liners 18 and 19 are side by side and have an opening between them to form a longitudinally extending slot 22 interconnecting the bores at the end of the worm 30. The worms 28 and 30 are rotated at their respective hubs 32 and 33 from a motor not illustrated, and are arranged to rotate oppositely and toward each other when viewed from above as shown in FIG. 1. The worms 28 and 30 are also arranged to fit the bores 21 and 20, respectively, with a close running clearance. It should be appreciated that the basic advantage of this invention is still realized if the two worms turn in the same direction using a forward feeding helix on each worm, although the treatment of the material is of a somewhat different character than when they turn in opposite directions.

In accordance with this invention, the main and auxiliary worms 28 and 30 comprises a plurality of interconnected but different sections, each section being displaced along the longitudinal axis of the worms, and each section contributing to the overall processing of the plastic material. The section designated by the letter A in FIG. 1 comprises a feed section of the apparatus, located generally toward the rear end thereof, adjacent the feed opening 25. Section B, located centrally within the apparatus, is a resistor section, the function of which will be explained more fully hereinafter. Section C is an extrusion section, located generally toward the front end of the apparatus and adjacent the die 26.

Within the feed section A, the worms 28 and 30 are comprised of the stems 34 and 36, respectively, and of helices or flights 38 and 40 formed integrally therewith. Resistor section B comprises the worm stems 42 and 44 of worms 28 and 30, respectively, and the integrally formed flights 46 and 48. Within the extrusion section C, the worms 28 and 30 are comprised of the stems 50 and 52, respectively, together with the integrally formed flights 54 and 56 thereof. The flights of the worm 28 are oppositely pitched to the flights of the worm 30 and will advance material from the hopper 24 to the die 26 when rotated as above described.

As may be seen in FIG. 1, a block 57 is provided at the forward end of the bore 20 adjacent the terminal end 58 of the worm 30 and has a conical recess 59 for reception of the tapered end 58 of the aforesaid worm. A side passage 62 is provided in the wall of the recess 59 to connect the recess with the bore 21.

As may best be seen in FIG. 2, thermometers 60a, 60b, 60c and 60d are set in the top part of the apparatus in orifices 61a, 61b, 61c and 61d provided for that purpose in the machine casing. The orifices 61a, 61b, 61c and 61d communicate respectively with the separate jacket zones 12, 13, 14 and 15. The temperature of the heat transfer medium circulated through the jackets 12, 13, 14 and 15 is measured in each of the aforesaid jackets or compartments by the thermometer individually associated therewith, thereby providing means for adjusting each of the independent zones or compartments to the desired temperature in a manner to be explained more fully hereinafter.

In the embodiment of the invention illustrated in FIGS. 1 and 2, the stems 34 and 36 of the feed section of the worms 28 and 30, respectively, are formed with flights 38 and 40 having a constant pitch which is approximately equal to the outside diameter thereof. The diameter of the stems 34 and 36 increases gradually from the feed opening 25 to the resistor section in the direction of the flow of material. As a consequence of the gradually increasing diameter of the stems 34 and 36, the free volume or space 63 between the worm stems 34 and 36 decreases in the direction of travel of the material. As a typical example of the relative dimensions of the bores, worms and flights of the feed section of an apparatus constructed in accordance with this invention, a typical worm in a machine having 2" bores would have a 2" flight lead, the flights thereof being ⅜" deep at the rear or feed end in the vicinity of the feed opening 25 and tapering to a depth of 3/16" at the downstream end prior to the point where the material enters the intermediate resistor section. The flights 38 and 40 of the feed section preferably terminate at the downstream end of that section to leave an annular space 64 which permits the free passage of material into the adjacent resistor section. It will be appreciated, however, that the flights of the feed section may be made continuous, if in practice it is found desirable to do so.

Within the intermediate resistor section of the apparatus, the stem portions 42 and 44, bearing the flights 46 and 48 of the worms 28 and 30, respectively, are substantially larger in diameter than the stem portions 34 and 36 within the feed section. The channel clearance or free volume 65 between each of the stems 42 and 44 and the liner 18 is considerably restricted, and is constant for the first few turns of the flight. In the last half turn of a complete flight, the channel clearance is further reduced to the small clearance 66. It will be understood that the small clearance 66 is located adjacent both the main worm 28 and the auxiliary worm 30. As an example of the relative dimensions of the elements of the resistor section of an apparatus constructed in accordance with this invention and illustrated in FIGS. 1 and 2, in a machine having 2" diameter bores, worms having flights with a pitch of about .8" and a depth of ¼" adjacent to space 65, with a final decrease in depth to about 1/16" and an axial open length of ⅝" adjacent the space 66, are found to be satisfactory. The aforedescribed arrangement provides a minimum depth of approximately one-thirtieth of the diameter of the bore.

The free flight area taken as the distance from the surface of the stem 42, for example, to the inner-surface of the bore lining 18, multiplied by the axial length of the flight opening at the same point, can be expressed in terms of the diameter of the bore, as follows: $D^2/102$ where D equals the diameter of the bore. The aforesaid free flight area can be increased or decreased in a range of $D^2/75$ to $D^2/150$. It will be appreciated that in larger size machines the free flight area, as defined by the foregoing formula, will be somewhat larger. A machine, as constructed according to this invention and exemplified in FIGS. 1 and 2 of the drawings, having 4½" diameter bores can successfully process standard general purpose wood flour filled phenolic molding powders at a through-put capacity in the order of one thousand pounds per hour. Since the size of the opening 66 is directly related to the free flight area as defined by the foregoing formula, it will be clear that the magnitude of the clearance 66 may be conveniently expressed in terms of the free flight area. Where, in a machine of the foregoing capacity, the worms of the resistor section are provided with a flight lead of two inches with an axial distance of 1 7/16" open channel by .178" depth adjacent the restricted clearance 66, the normal size of the clearance or space 66, as indicated by the aforementioned formula, is approximately $D^2/80$.

Although the measurement of the size of the aforesaid opening or clearance 66 has been made in terms of $D^2$, using a sliding scale for the denominator as the most convenient means of giving a basic quantitative determination, it will be appreciated that the measurement could be alternatively expressed in terms of the size of the restrictor opening.

Within the extrusion section of the apparatus, the diameter of the stem 50 of the worm 28 is preferably decreased to slightly over one-half of the diameter of the bore and the flights 54 thereof are commonly of a constant pitch which may vary from a value equal to three-quarters of the outside diameter thereof. The flights 56 of the worm 50 can be similar in pitch to the flights 54 of the worm 28 or of some other design serving to pass the material across from flights 56 and the worm 30 into the flights 54 of the worm 28. It will be appreciated that the extrusion portion of the worm 28 may be varied in design such as by the use of a decreasing pitch of helix or increasing stem diameter, where the nature of the processing may require such modification.

It is usually desirable to have a highly polished surface, such as chrome plating or mirror finish, on the surfaces of the worm channels.

As may best be seen in FIG. 2, a vent opening 68 is formed in the top surface of the lining 18, which communicates directly with a vent 69 extending upwardly from the top of the machine casing and formed integrally therewith. A cover 70 having a vent orifice 71 and secured by screws 72 and 73 to an outwardly flanged portion 74 of the vent wall 69 is provided for substantial closure of the vent. The orifice 71 is provided in the central portion of the cover 70 for connection with a vacuum pump to aid in the devolatilization of the plastic material in a manner to be more fully described hereinafter. It will be appreciated that the apparatus may be used without the vent cover 70 whenever it is desired that the vent 69 open only into the atmosphere. It will be further appreciated that the vent opening 68 and the vent 69 may be entirely eliminated and the liners and casing of the apparatus be made solid.

As may best be seen in FIGS. 1 and 2, the flight 54 of the worm 28 terminates adjacent the die 26 with an edge 75 thereof spaced a small distance 76 from the inner face 77 of the die. The tip end of the worm 28 approaching the die 26 is constructed to provide a maximum wedging action in order to push the plastic material through the holes 27 of the die 26 and, as a consequence, the flat edge 78 resulting from a transverse cut, as shown in FIG. 4, is reduced to the smallest practical area. Preferably the distance 76 from the tip 75 of the worm 28 to the inner face 77 of the die 26 should be very close, just sufficient to give a running clearance. In some cases, it will be desirable to space the tip 75 as close as 0.010" from the inner face 77 of the die 26. Although the wedging action of the worm tip 75 tends to lessen as the spacing 76 is increased, the aforesaid wedging action tending to lose its effectiveness entirely as the distance 76 approaches 0.10", it will be appreciated that wider spacing can be used if additional heat and working of the plastic material are desired at this point.

FIG. 7 illustrates a modification of the worm stems and flights within the feed section of the apparatus provided in accordance with this invention. The oppositely rotating worms 28a and 30a have flights 38a and 40a formed integrally with the worm stems 34a and 36a and are rotated by their respective hub ends 32a and 33a. The worm stems 34a and 36a are of constant diameter of each of their respective bores, 21a and 20a. For example, where the bore is approximately 2", the respective worm stem diameter is preferably about 1⅛". The pitch of the flights 38a and 40a decreases in the direction of the flow of the material. Where the dimensions of the worm stems and bores are as given above, the aforesaid flights have approximately a 2" pitch in the vicinity of the feed opening 13 and decrease to a pitch of about 1¼" at the downstream end approaching the resistor section.

FIG. 8 illustrates a modification of the worms of the resistor section as provided in accordance with this invention. The worms 28a and 30a have stems 42a and 44a, respectively, having flights 46a and 48a, respectively, formed integrally therewith. The flights 46a and 48a preferably have a pitch of from one-quarter to one-half the outside diameter thereof, while the stems 42a and 44a increase in diameter in the direction of the flow of the material. In a 2" diameter worm, for example, a clearance of ¼" at the deep end which decreases to 1/16" at the shallow end is satisfactory.

In the modification of the apparatus, as provided in accordance with this invention and illustrated in FIG. 9, the worm stem 50a and flight 54a of a worm 28a which revolves within the bore 21a are flared outwardly at the terminal end of the worm in the extrusion section adjacent the die 26a. As may be seen in FIG. 9, the bore 21a terminates in an outwardly flared portion 19b for the accommodation of the flared flight 54a. In like manner, the die 26a is provided with an outwardly flared bore 26b adjacent the inner face 77a for the accommodation of the flared flight 54a and which supplements the flared portion 19b of the bore 21a. The die holes 27a, in this modification of the invention, comprise a short cylindrical portion 29a having a length approximately equal to the diameter and an outwardly tapering portion 29b opening at the outer face of the die 26a which is arranged to taper to a larger diameter in the direction of the flow of the plastic material. It will be appreciated that in this modification of the invention, the flared elements of bore, worm stem and worm flight may be used with a die in which the short cylindrical section of the die holes has been eliminated and in which the holes taper from the inner face to the outer face of the die, as illustrated in FIGS. 1 and 2.

As may best be seen in FIG. 10, which illustrates in greater detail the manner in which the edge 75a of the flight 54a approaches the inner face 77a of the die 26a, a clearance or distance 76a is provided between the edge 75a and the aforesaid inner face 77a of the die which is reduced to the practical minimum. The surface 79a of the worm flight 54a approaches the edge 75a and turns parallel to the die face 77a for a minimum distance to form the space 76a between the end of the worm and inner face of the die. A wedge-shaped space 80a is also formed between the moving surface 79a of the flight 54a and the inner face 77a of the die 26a. Another modification of the die, as provided in accordance with this invention, is illustrated in FIG. 11, in which the die 26b is provided with holes 27b having a straight cylindrical portion 29c followed by a shoulder 31b and an outwardly flared portion 29d beyond the shoulder 31b.

A further modification of the die and worm as provided in accordance with this invention, which may be used for the production of a continuous ribbon of material, is illustrated in FIGS. 12 and 13. The bore 21c is followed by a die 26c having an inner face formed of tapering walls 77c which form a conical space 82c within the die. A slot 83c leads from the aforesaid conical space 82c to the outer face of the die. The worm flight 54c of the worm 28c tapers gradually from its dimensions within the bore 21c to a point 75c adjacent the end of the slot 83c. The flight 54c is arranged to conform with the conical space 82c and to have a close clearance with the walls 77c of the die in the order of 1/32 inch to 1/16 inch.

*Operation*

In typical operation, the mixture of the resin, filler or other material to be plasticized, is usually supplied to the hopper 24 in powder form. The forwarding flights 38 and 40 of the feed portions of the worms 28 and 30 receive the material to be processed and advance it through the bores 20 and 21 formed by the heated liners 18 and 19, respectively. The working and the heating of the material forms it into a plasticized mass of high viscosity. In the processing of the material, the heating and working of the material must be performed to effect the particles of the material uniformly so that no portion thereof is overworked or underworked. Although the stems 50 and 52 and the flights 46 and 48 thereof of the resistor section create a back pressure so that the mass of material is worked under pressure, the flights 38 and 40 of the feed section steadily force the material through the reduced area channel in a continuous stream without any large scale re-circulation or stagnation of the material at the end of the flights 38 and 40. The jackets 12 and 13 are used to control the surface temperature of the liners 18 and 19, thereby influencing the temperature of the material being treated and the character of the mechanical working given to the material by the worms 28 and 30.

The flights 46 and 48 of the resistor section receive the viscous material and move it continuously forward, thereby forcing the material through the small space 66 through which the material must pass before escaping from the resistor portion of the worm. The small cross-section of the channels 65 and 66 within the resistor section greatly increases the speed of the relatively large moving volume of material delivered by the flights 38 and 40 of the feed section and also spreads the viscous material thinly to provide a uniform mixing and heating thereto. The free volume of an axial section in the worm flight at the point of the restricted space 66 is in the order of one-twentieth as great as the corresponding volume between flights 38 or 40 in the vicinity of the hopper opening 24, and consequently there is a tendency for the worms to exert considerable compression on the material at this point, with consequent shearing, heating and mixing thereof as pressure is generated thereon and as the material is issued through the restricted space 66 into an area of reduced pressure beyond. Accordingly, the reduction of the cross-sectional area of the passage around the stems 42 and 44 and particularly through the restricted space 66, serves to generate a back pressure on the material that is being forwarded by the flights of the feed and resistor sections, thereby affording a continuous process of the powder feeding, plasticizing and working while feeding forward and forcing the material through the restriction 66 to complete one stage of pre-plasticizing and working as a part of the entire process. Simultaneously, a controlled forwarding of the material is maintained in the aforementioned space 66 and, as a consequence, a condition is created that forwards the material without excessive heat build-up or stagnation, which otherwise would produce decomposition or over-curing of the material, either of which would render the aforesaid material unsatisfactory. It will be apparent from the foregoing description that each of the worms of the feed and resistor sections may be constructed as a continuous worm having an uninterrupted helical flight arranged to force the viscous material through a small space into an extrusion section of the apparatus, and would not, if so constructed, depart from the spirit and scope of this invention.

From the resistor section, the high viscosity fluid is continually passed under the vent opening 68 and into the flights 54 and 56 of the extrusion section. In some cases, free volatiles are present at this point because of the curing of the material which has occurred in the preceding sections. Accordingly, the aforesaid volatiles are allowed to escape through the vent opening 68. Usually these volatiles are drawn off through the application of a partial vacuum through the vent orifice 71 of the vent cover 70. The liner temperature of this devolatilization stage is controlled by the heat transfer medium circulating in the jacket zone 14.

As the material is advanced by the flights 54 and 56 of the extrusion section, it remains at a relatively elevated temperature and curing will therefore continue. Consequently, the material is ejected from the process promptly, whether with or without devolatilization, and formed into the desired shape and the cure terminated by subsequent cooling. As the material moves through the extrustion section, the portion thereof contained in the flight spaces of the flight 56 of the worm 30 is transferred through the slot 22 along the surface 62 into the spaces of the flight 54 of the worm 28. The material is carried rapidly to the die 26 and forced through the die holes 27. Upon passing through the die holes 27, the material is formed into rods which, if desired, can be cut into pellets or the like. It will be evident that in the course of moving from the restriction 66 of the resistor section to and through the die holes 27, an additional amount of curing of the material occurs, on the one hand, as a result of maintaining the material at approximately the same elevated temperature it had attained, by the time it issued into the extrusion section, as a result of the earlier mixing and working of the material, and, on the other hand, by the brief high pressure ejection of the material through the die holes 27 by the tip 75 of the worm 28, which affords a final mixing and final heat input to the material. It will be evident that the design of the die 26 influences the intensity of the aforesaid action and is such that the total heating and shearing that takes place on the material in the feed, resistor and extrusion sections, including the vapor extraction, gives the correct amount of heating, mixing and partial cure needed in the product. It should be appreciated that smaller holes and a greater distance through the holes of the die make for gerater resistance and more mechanical work on the material. Frequently, the jacket 15 is kept at a low temperature of from about 100° F. to about 150° F., in order to help cool the material in the extrusion section adjacent the die. It is important to note, however, that by reason of the arrangement of the tip end 75 of the worm 28 adjacent the die 26, a maximum wedging action is provided whereby the plastic material is forced through the holes 27 attended by a substantially smaller temperature rise than would otherwise occur.

It has been found that die holes flaring outwardly offer considerably less resistance to the flow of the material through the die holes than if the holes are straight cylinders. For example, a die plate ⅝" thick having closely spaced holes with a diameter of 0.120" at the inner face, followed by an outwardly tapering section to 0.145" at the outer face offers less heat build-up in the material than the same die having straight through holes of 0.145" diameter.

In the modification of the invention illustrated in FIGS. 8 and 9, the outward flare of the worm 28a and the bore 21a behind the die 26a permits the use of a greater number of holes in the die than would otherwise be possible, thereby facilitating the flow of material through the die and reducing the back pressures created thereby. As a consequence, it will be evident that less pressure is required for forcing the material through the die. Furthermore, the construction of the flared bore, worm, worm flight, and die, as hereinbefore described, and illustrated in FIGS. 8 and 9, afford a method of reaching a maximum mechanical strength in the worm attended with a minimum number of stagnation areas on either the front or the rear face of the worm flight. The material is carried through the wedge-shaped space 80a and in front of the moving surface 79a and squeezed out through the opening 27a. The aforesaid wedging action develops almost instantaneously a very high extrusion pressure on the material (several thousand pounds per square inch), and concentrates a small amount of working and heating of the material to this localized area at the die and to one or two front flights of the worm immediately upstream, thereby considerably reducing the working and heating of the material that takes place in the worm flight between the vent opening 68 and the die 26a. It will be evident that the necessary control is thereby provided for relatively quick curing of materials.

As the material issues through die openings 27a, it is preferably cut into pellets which are then air-cooled. The pellets are the finished product of the process ready for the final molding step according to known standard methods. The pellets can be stored for long periods between formation by this process and final molding.

It will be evident from the foregoing description that the total temperature, working and timing must occur within proper limits to produce a satisfactory product. For example, if it were attempted to separate the process into two parts, such as by cooling off the product as it issues from the restriction 66 of the resistor section, and extruding it through the die orifices for pellet formation at a later time, there would result a change in the total heat history of the material as a consequence of the fact that curing would continue at a decreasing rate while the intermediate material was being cooled and would again start and progress at an increasing rate when the material was again heated up for extrusion as a second operation. Accordingly, as a result of the greater heat history of the material, a change would be brought about in the nature of the product.

In the modification of the invention illustrated in FIGS. 12 and 13, the plastic material is carried through the bore 21c by the flight 54c and then into the cone 82c where stagnation of the material is prevented because of the close clearance of the flight 54c with the side wall 77x of the conical inner face of the die. Upon leaving the cone 82c, the material moves through the slot 83c and issues as a continuous ribbon. It will be appreciated that heaters may be applied to the outer surfaces of the die 26c, if desired. In many cases, the quality of the strip produced is superior to products produced by other known methods for the reason that it can be formed at low pressures and temperatures, is continuous and uniform in quality, and, in the processing of fibrous-filled materials, eliminates the formation of planes of cleavage where fibers are not interlaced that sometimes occurs in other processes. The apparatus and method of the modification of the invention illustrated in FIGS. 12 and 13 is especially advantageous with rag-filled materials.

Since the heat to which the material is subjected is important, the temperature of the circulating medium is carefully controlled and measurement thereof is taken by the thermometers 60a, 60b, 60c and 60d. Heat is not only obtained from the circulating medium in the compartments 12, 13, 14 and 15, if required, but is also generated from the working of the material by the flights of the worms themselves. Accordingly, it will be clear that the circulating medium in the compartments around the bores of the apparatus may thus absorb heat from the material in order to maintain it at its proper temperature. The worms of the apparatus may also be cored for circulation of heat transfer medium by means familiar in the art.

Heating and plasticizing of the treated materials take place gradually through the flights 38 and 40 of the feed section and flights 46 and 48 of the resistor section of the worms 28 and 30, respectively, and is ordinarily held below the point where too much cure would occur. As the treated material passes from the flights 46 and 48 of the resistor section into the flights 54 and 56 of the extrusion section, the pressure created by the restriction of the clearance 66 and the reduced pitch of the flights 46 and 48 is reduced and as a consequence volatiles escape from the material at this point.

As previously mentioned, a vacuum may be applied to the vent 69 to aid in the removal of volatiles from the plastic material. The vent 69, however, not only aids in the removal of volatiles from the material but also sometimes otherwise affects the operation by reason of the reduced pressure effected by the application of a vacuum thereto, which correspondingly increases the forward pressure applied by the preceding flights of the worms and thereby increases the pressure on the material itself. Hence, it will be clear that the vacuum not only volatiles and gases from the material at the vent 69, but the effect thereof sometimes reaches back into the material being carried by the flights 46 and 48 of the resistor section and also the flights 38 and 40 of the feed section. Moreover, since the material being treated in the feed and resistor sections is sometimes only partially plasticized, it is neither so homogeneous nor so dense as it will later become, and, accordingly, the porosity of the material provides channels through which air and vapors pass. The vacuum pulls the air and other vapors through the material which is moving from the hopper and advancing toward the vent. The aforedescribed movement of the vapors in a forward direction assists in the drawing forward of the material itself and also promotes its densification, thereby creating a better extrusion condition. Moreover, the forward movement of the air provides a considerable improvement over the operation of the machine which occurs when all the air, on being passed out, is forced to move backward toward the hopper 24 in a direction opposite to the movement of the material for the reason that an appreciably higher throughput is effected. The effect of the forward movement of the air is particularly advantageous when the material introduced into the hopper is of a fluffy character. In addition to the foregoing advantages of the evaporation of volatiles as aforedescribed, another important advantage is realized by the cooling of the material therefrom, which promotes the overall heating and curing process.

From the foregoing description of the operation of the material treating apparatus as provided in accordance with this invention, it will have become clear that in the processing of thermosetting raw materials, such as phenol-formaldehyde, ureaformaldehyde, melamines, and the like, the cure of polymerization of the materials begins to take place immediately after the temperature thereof has been raised and continues progressively to convert the resin into a hard substance that will not soften on further application of heat. A portion of the polymerization of the materials takes place in the finished mold or other device when the material has finally formed. However, it is important that the final polymerization should not take place before the material has reached the final stage of molding. The greater the advance of the cure of the resin in the preparation process, the harder the flow of material in the final molding step. Accordingly, too much polymerization in the processing machines, prior to the introduction to the final molds, will result in the end product not flowing sufficiently to fill the entire mold or not having its full strength and desirable physical properties.

In preparing the material so that it will be suitable for processing, it is usually desirable to have a uniform and fine dispersion of the various materials that make up the mix. For instance, a high intensity centrifugal mixer does a good job of breaking up agglomerates of filler or some other materials, resulting in a uniform mix. If liquid ingredients are present in sufficiently large proportion to make a wet mass, other mixing methods must be used.

This invention is successful in processing standard formulations of such molding powders as phenol-formaldehyde based pre-mixes. Existing standard commercial mixes that were formerly processed on a two roll mill are being successfully treated according to the teaching of this invention. Included is a typical formula such as 46% phenol-formaldehyde dry resin, 1½% lubricant, 2% color, ½% catalyst and other additives, and 50% wood flour filler. Similar standard compositions, but using different fillers such as string, rag, cotton fibers, asbestos fibers, and other have been successfully treated. A similar range of standard mixes based on melamine-formaldehyde resin have been treated successfully.

There is a wide variety of materials currently used in industry capable of being successfully processed through this equipment. They vary as to oftening point, the temperature span between softening and curing, plastic flow properties, time of curing and so forth. The jacket temperatures are adjusted to give the appropriate temperature control for the material being processed. These temperatures are generally closer to a figure predictable from the known characteristics of the material. The design of the worms detailed herein is capable of processing a wide variety of mixes. For some materials, change in worms, dies, jacket temperatures and other operating conditions may be required for the obtaining of optimum results. Such changes, when made according to the teachings of this disclosure, are understood to be within the scope of this invention.

The method of this invention achieves exactly the degree of preliminary processing and partial polymerization of thermosetting materials necessary to the successful treatment of such materials by providing means for the careful control of heating, plasticizing and polymerization thereof.

It will be apparent that another important advantage of this invention is realized in the provision of a process whereby a product is produced which is readily adaptable to shaping into a variety of physical forms as desired.

Still another significant advantage of the invention lies in the provision of an apparatus and method of processing plastic materials whereby said materials are simultaneously pre-cured prior to the final curing or polymerization thereof in the molded form.

Although this invention has been disclosed with reference to specific forms and embodiments thereof, it should be evident that a great number of variations may be made without departing from the spirit and scope of this invention. For example, equivalent elements may be substituted for those specifically disclosed and certain features of the invention may be used independently of other features, all without departing from the spirit and scope of this invention as defined in the appended claims.

Having thus described my invention, I claim:

1. In apparatus for treating thermosetting plastic material which sets up to form a rigid solid mass when allowed to dwell in a zone at elevated temperature, the combination comprising a casing having a pair of substantially parallel cylindrical bores arranged in side-by-side relation, a feed opening at one end of said casing communicating with said bores and an opening placing said bores in communication with each other, an extruding die secured to said casing and spaced downstream of said feed opening, and oppositely rotatable feed members with non-intermeshing helical flights extending respectively into said bores and successively through feed, resistor and extrusion sections of said apparatus with at least one of said feed members extending to a maximum of about one-eighth inch of said extruding die, said helical flights of the feed members each extending substantially throughout the length of the bore occupied thereby for uninterruptedly advancing said material through said apparatus, said helical flights having forwardly feeding resistor portions disposed in side-by-side relation to one another and each forming a limited but constantly forward feeding restriction, and said extrusion section having forward feeding flights extending substantially throughout its length and having a throughput capacity which is greater than that of the resistor section.

2. The apparatus defined in claim 1 wherein each feed member is in the form of a worm comprising a stem and material advancing flights in the feed, resistor and extrusion sections of the apparatus, the portion of said worm in the feed section of the apparatus including a stem portion increasing in diameter in a downstream direction and having flights of substantially uniform pitch, the portion of said worm in the resistor section of the apparatus including a stem portion having a diameter greater than that of the stem portion in said feed section of the apparatus and coacting with the associated flights to form a restricted passage adjacent said bore.

3. The apparatus defined in claim 2 wherein the flight pitch in the resistor section of the apparatus is less than the flight pitch in the feed section of the apparatus.

4. The apparatus defined in claim 3, wherein the stem of the worm portion in the resistor section of the apparatus increases in diameter in a downstream direction and in the last full one-half turn of the associated flights is of a maximum size.

5. The apparatus defined in claim 1, wherein each feed member is in the form of a worm comprising a stem and material advancing flights in the feed, resistor and extrusion sections of the apparatus, the portion of said worm in the feed section of the apparatus including a stem portion which is substantially uniform in diameter and flights decreasing in pitch in a downstream direction, the portion of said worm in the resistor section of the apparatus including a stem portion having a diameter greater than that of the stem portion in said feed section of the apparatus and coacting with the associated flights to form a restricted passage adjacent said bore.

6. The apparatus defined in claim 1 wherein each feed member comprises a stem and material advancing flights in the feed, resistor and extrusion sections of the apparatus, the feed section of the apparatus including a stem portion increasing in diameter in a downstream direction and flights of substantially uniform pitch, the portion in said resistor section of the apparatus including a stem portion having a diameter greater than that of the stem portion in said feed section of the apparatus and increasing in diameter in a downstream direction, and flights of substantially uniform but lesser pitch than the flights in said feed section of the apparatus whereby to afford a restricted passage adjacent said bore, said extruding section of the apparatus having a stem portion substantially uniform in diameter and flights substantially uniform in pitch.

7. The combination defined in claim 1 wherein one of the feed members extends close up to the extruding die and the other terminates upstream thereof.

8. The combination defined in claim 1 wherein each orifice in said die is frusto-conical in shape and the small diameter end thereof is at the upstream side of the die.

9. In a process for mixing and partially curing thermosetting plastic material having a curing rate which increases with increased temperature, and which sets up to form a rigid solid mass when allowed to dwell at elevated temperature, the steps which comprise establishing a steady stream of the material moving in one direction successively through feed, resistor and extrusion zones, in said feed zone applying a predetermined forward feeding effort to advance said material constantly forwardly while mixing the same at a controlled temperature, in said resistor zone applying a predetermined substantially reduced forward feeding effort with further mechanical working and advance of the cure at a controlled temperature, in said extrusion zone helically forcing the material with an extrusion worm toward an extrusion die while further mixing said material, and substantially immediately discharging said material through said die in a partially cured state, said die being spaced from the downstream end of said extrusion worm at a maximum distance of about one-eighth inch.

10. In a process for mixing and partially curing a thermosetting material having a curing rate which increases with increased temperature, and which sets up to form a rigid solid mass when allowed to dwell excessively at elevated temperature, the steps comprising establishing a steady flow of the material moving in a downstream direction successively through feed, resistor and extrusion zones, in said feed zone applying a predetermined forward feeding effort to advance said material substantially constantly forwardly while mixing the same, in said resistor zone applying a substantially reduced forward feeding effort to move all said material forwardly for discharge thereof into said extrusion zone after further mechanical working and limited advance of the cure in said extrusion zone substantially constantly moving said material forwardly and mixing said material still further, and discharging said material from said extrusion zone in a partially cured state without permitting any of said material to dwell for a distance exceeding about one-eighth inch in the area immediately upstream of said extrusion.

References Cited in the file of this patent

UNITED STATES PATENTS

| | | |
|---|---|---|
| Re. 23,948 | Fuller | Feb. 15, 1955 |
| 1,007,016 | Weir | Oct. 24, 1911 |
| 1,684,203 | Royle | Sept. 11, 1928 |
| 2,291,212 | Clinefelter | July 28, 1942 |
| 2,441,222 | Fuller | May 11, 1948 |
| 2,488,189 | Hanson | Nov. 15, 1949 |
| 2,507,311 | Lodge | May 9, 1950 |
| 2,508,495 | Consalvo | May 23, 1950 |
| 2,543,894 | Colombo | Mar. 6, 1951 |
| 2,595,210 | Clinefelter | Apr. 29, 1952 |
| 2,733,051 | Street | Jan. 31, 1956 |
| 2,769,201 | Lorenian | Nov. 6, 1956 |

FOREIGN PATENTS

| | | |
|---|---|---|
| 649,187 | Germany | Aug. 18, 1937 |